(12) United States Patent
Tong et al.

(10) Patent No.: US 8,024,326 B2
(45) Date of Patent: *Sep. 20, 2011

(54) METHODS AND SYSTEMS FOR IMPROVING A SEARCH RANKING USING RELATED QUERIES

(75) Inventors: Simon Tong, Mountain View, CA (US); Mark Pearson, San Mateo, CA (US); Sergey Brin, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/351,648

(22) Filed: Jan. 9, 2009

(65) Prior Publication Data

US 2009/0112857 A1    Apr. 30, 2009

Related U.S. Application Data

(63) Continuation of application No. 10/661,748, filed on Sep. 12, 2003, now Pat. No. 7,505,964.

(51) Int. Cl.
*G06F 17/30* (2006.01)
(52) U.S. Cl. ......... 707/721; 707/706; 707/708; 707/727
(58) Field of Classification Search .............. 707/3, 101, 707/102, 709, 706, 721, 723, 726
See application file for complete search history.

(56) References Cited

U.S. PATENT DOCUMENTS

| | | | |
|---|---|---|---|
| 5,696,962 A | 12/1997 | Kupiec | |
| 6,006,222 A | 12/1999 | Culliss | |
| 6,014,665 A | 1/2000 | Culliss | |
| 6,078,916 A | 6/2000 | Culliss | |
| 6,088,692 A | 7/2000 | Driscoll | |
| 6,182,068 B1 | 1/2001 | Culliss | |
| 6,185,559 B1 | 2/2001 | Brin et al. | |
| 6,285,999 B1 | 9/2001 | Page | |
| 6,321,228 B1 | 11/2001 | Crandall et al. | |
| 6,353,849 B1 | 3/2002 | Linsk | |
| 6,526,440 B1 | 2/2003 | Bharat | |
| 6,529,903 B2 | 3/2003 | Smith et al. | |
| 6,539,377 B1 * | 3/2003 | Culliss | 707/706 |

(Continued)

FOREIGN PATENT DOCUMENTS

WO    WO 00/77689    12/2000

(Continued)

OTHER PUBLICATIONS

Dan Olsen et al., "Query-by-critique: Spoken Language Access to Large Lists", ACM, Oct. 2002, pp. 131-140.

(Continued)

*Primary Examiner* — Thuy Pardo
(74) *Attorney, Agent, or Firm* — Fish & Richardson P.C.

(57) ABSTRACT

Systems and methods that improve search rankings for a search query by using data associated with queries related to the search query are described. In one aspect, a search query is received, a related query related to the search query is determined, an article (such as a web page) associated with the search query is determined, and a ranking score for the article based at least in part on data associated with the related query is determined. Several algorithms and types of data associated with related queries useful in carrying out such systems and methods are described.

60 Claims, 4 Drawing Sheets

U.S. PATENT DOCUMENTS

| | | | |
|---|---|---|---|
| 6,567,103 | B1 | 5/2003 | Chaudhry |
| 6,587,848 | B1 | 7/2003 | Aggarwal et al. |
| 6,615,209 | B1 | 9/2003 | Gomes |
| 6,658,423 | B1 | 12/2003 | Pugh et al. |
| 6,678,681 | B1 | 1/2004 | Brin |
| 6,725,259 | B1 | 4/2004 | Bharat |
| 6,738,764 | B2 | 5/2004 | Mao et al. |
| 6,754,873 | B1 | 6/2004 | Law et al. |
| 6,795,820 | B2 | 9/2004 | Barnett |
| 6,853,993 | B2 | 2/2005 | Ortega et al. |
| 6,877,002 | B2 | 4/2005 | Prince |
| 6,901,402 | B1* | 5/2005 | Corston-Oliver et al. .... 707/101 |
| 6,944,611 | B2 | 9/2005 | Flank et al. |
| 6,990,453 | B2 | 1/2006 | Wang et al. |
| 7,117,206 | B1 | 10/2006 | Bharat et al. |
| 7,395,222 | B1 | 7/2008 | Sotos |
| 7,565,367 | B2* | 7/2009 | Barrett et al. .................. 707/706 |
| 2002/0042791 | A1 | 4/2002 | Smith et al. |
| 2002/0049752 | A1* | 4/2002 | Bowman et al. .................. 707/3 |
| 2002/0123988 | A1 | 9/2002 | Dean et al. |
| 2002/0133481 | A1 | 9/2002 | Smith et al. |
| 2003/0037074 | A1 | 2/2003 | Dwork et al. |
| 2003/0078914 | A1 | 4/2003 | Witbrock |
| 2003/0120654 | A1* | 6/2003 | Edlund et al. ..................... 707/7 |
| 2003/0135490 | A1* | 7/2003 | Barrett et al. ..................... 707/3 |
| 2003/0149704 | A1* | 8/2003 | Yayoi et al. ................... 707/102 |
| 2003/0204495 | A1 | 10/2003 | Lehnert |
| 2003/0229640 | A1 | 12/2003 | Carlson et al. |
| 2004/0059708 | A1 | 3/2004 | Dean et al. |
| 2004/0119740 | A1 | 6/2004 | Chang et al. |
| 2004/0122811 | A1 | 6/2004 | Page |
| 2004/0153472 | A1 | 8/2004 | Rieffanaugh, Jr. |
| 2004/0186828 | A1* | 9/2004 | Yadav et al. ..................... 707/3 |
| 2004/0215607 | A1 | 10/2004 | Travis |
| 2005/0027691 | A1 | 2/2005 | Brin et al. |
| 2005/0033803 | A1 | 2/2005 | Vleet et al. |
| 2005/0050014 | A1 | 3/2005 | Gosse et al. |
| 2005/0055342 | A1 | 3/2005 | Bharat et al. |
| 2005/0055345 | A1* | 3/2005 | Ripley ............................... 707/3 |
| 2010/0106706 | A1* | 4/2010 | Rorex et al. ................... 707/709 |

FOREIGN PATENT DOCUMENTS

| | | |
|---|---|---|
| WO | WO/0116807 | 3/2001 |
| WO | WO 01/67297 | 9/2001 |
| WO | WO 2004/059514 | 7/2004 |

OTHER PUBLICATIONS

Susan Gauch et al., "A Corpus Analysis Approach for Automatic Query Expansion and its Extension to Multiple Databases", ACM, 1999, pp. 250-269.

Nicolas Bruno et al., "Top-K Selection Queries over Relational Databases: Mapping Strategies and Performance Evaluation", ACM, Jun. 2002, pp. 153-187.

Ji-Rong Wen et al., "Query Clustering using User Logs", ACM, Jan. 2002, pp. 59-81.

Boyan, J., A Machine Learning Architecture for Optimizing Web Search Engines, School of Computer Science, Carnegie Mellon University, May 10, 1996.

Brin, S. and L. Page, The Anatomy of a Large-Scale Hypertextual Web Search Engine, Computer Science Department, 1998.

International Search Report and Written Opinion for Application No. PCT/US2004/029615, dated Jan. 19, 2005, 12 pages.

Australian Patent Office Non-Final Office Action in AU App. Ser. No. 2004275274, mailed Feb. 3, 2010, 2 pages.

Indian Office Action in Indian Application No. 686/KOLNP/2006, mailed Mar. 6, 2008, 2 pages.

International Preliminary Report on Patentability for Application No. PCT/US2004/029615, dated Mar. 23, 2006, 7 pages.

Danish Search Report and Written Opinion for Application No. 200601630-7, dated Jun. 21, 2007, 15 pages.

International Search Report and Written Opinion for Application No. 200806756-3, dated Nov. 19, 2010 12 pages.

* cited by examiner

METHODS AND SYSTEMS FOR IMPROVING A SEARCH RANKING USING RELATED QUERIES

CROSS-REFERENCE TO RELATED APPLICATIONS

This application is a continuation application of and claims priority to U.S. application Ser. No. 10/661,748, filed on Sep. 12, 2003, which is herein incorporated by reference in its entirety.

FIELD OF THE INVENTION

The invention generally relates to search engines. More particularly, the invention relates to methods and systems for improving a search ranking using related queries.

BACKGROUND OF THE INVENTION

Conventional search engines operating in a networked computer environment such as the World Wide Web or in an individual computer can provide search results in response to entry of a user's search query. In many instances, the search results are ranked in accordance with the search engine's scoring or ranking system or method. For example, conventional search engines score or rank documents of a search result for a particular query based on the contents of the documents, such as on the number of times a keyword or particular word or phrase appears in each document in the search results. Documents include, for example, web pages of various formats, such as HTML, XML, XHTML; Portable Document Format (PDF) files; and word processor and application program document files. Other search engines base scoring or ranking on more than the content of the document. For example, one known method, described in an article entitled "The Anatomy of a Large-Scale Hypertextual Search Engine," by Sergey Brin and Lawrence Page, assigns a degree of importance to a document, such as a web page, based on the link structure of the web page. Other conventional methods involve selling a higher score or rank in search results for a particular query to third parties that want to attract users or customers to their websites.

In some instances, a user of a search engine may enter an obscure or infrequently used search query. In response to such queries, conventional search engines can return unreliable search results since there is relatively little data to rank or score search results for the search query.

If an Internet search engine returns more than one search result in response to a search query, the search results may be displayed as a list of links to the documents associated with the search results. A user may browse and visit a website associated with one or more of the search results to evaluate whether the website is relevant to the user's search query. For example, a user may manipulate a mouse or another input device and "click" on a link to a particular search result to view a website associated with the search result. In many instances, the user will browse and visit several websites provided in the search result, clicking on links associated with each of the several websites to access various websites associated with the search results before locating useful or relevant information to address the user's search query.

If the user is not satisfied with the initial search results, the user may decide to change or modify the search query to a second, typically-related query and obtain a new or similar set of search results. After inputting the second query and receiving new search results, the user may manipulate a mouse or another input device and "click" on a link to a particular search result to view a website associated with the search result. As before, the user may browse and visit several websites associated with the search results returned for the second query by "clicking" on links associated with the websites returned in the search results.

Clicking on multiple links to multiple websites associated with a single set of search results can be time consuming. It is desirable to improve the ranking algorithm used by search engines and to therefore provide users with better search results.

SUMMARY

Embodiments of the present invention comprise systems and methods that improve search rankings for a search query by using data associated with queries related to the search query. One aspect of an embodiment of the present invention comprises receiving a search query, and determining one or more related queries related to the search query. Such related queries may be defined and determined in a variety of ways. Another aspect of an embodiment of the present invention comprises determining an article (such as a web page) associated with the search query, and determining a ranking score for the article based at least in part on data associated with the related query. Such related query data may include one or more of a variety of data associated with the related query. Also, a variety of algorithms using related query data may be applied in such systems and methods.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

The present invention comprises methods and systems for improving a search ranking by using related query data. Reference will now be made in detail to exemplary embodiments of the invention as illustrated in the text and accompanying drawings. The same reference numbers are used throughout the drawings and the following description to refer to the same or like parts.

Figure 1:
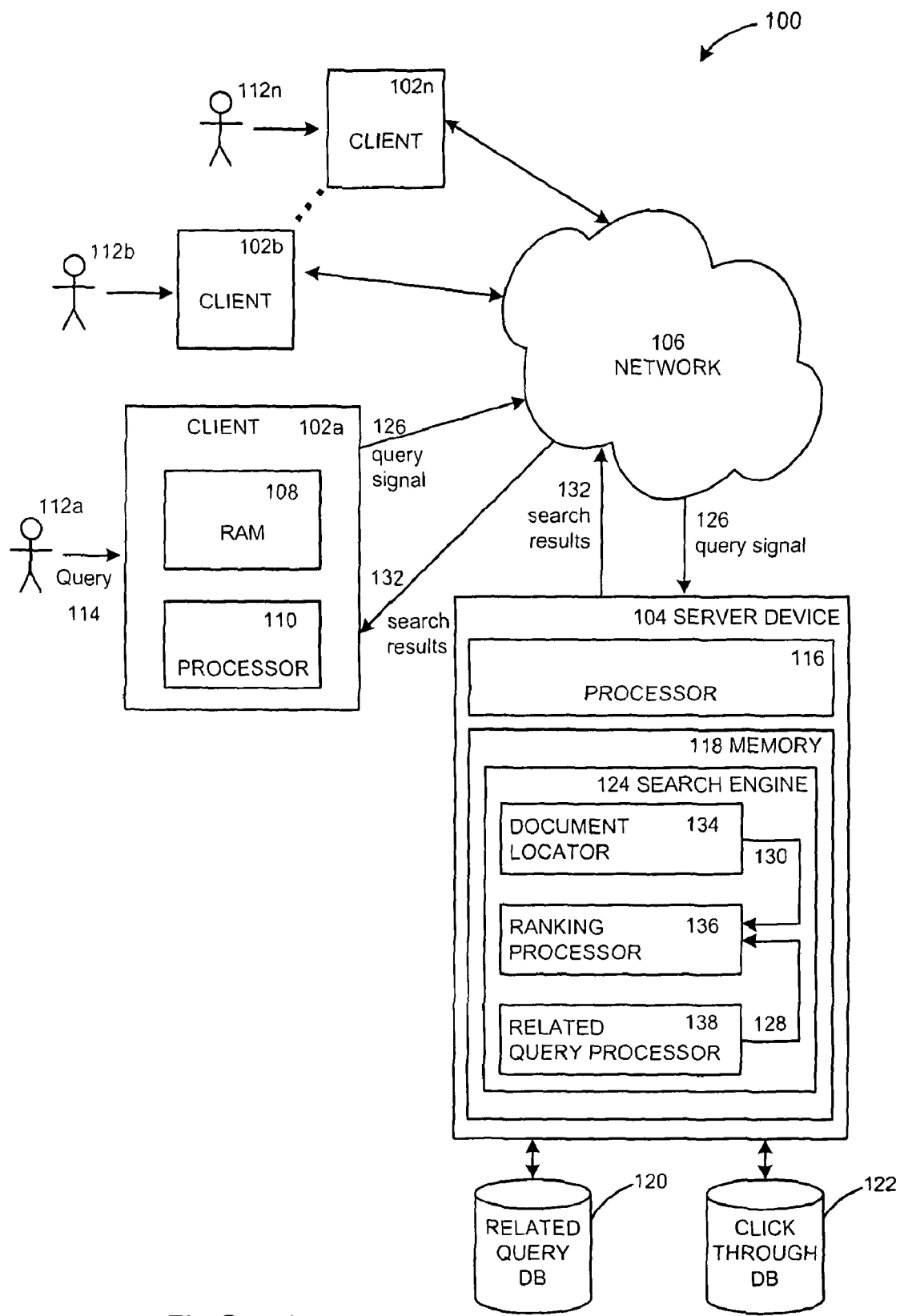
FIG. 1 illustrates a block diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

The system 100 shown in FIG. 1 includes multiple client devices 102a-n, a server device 104, and a network 106. The network 106 shown includes the Internet. In other embodiments, other networks, such as an intranet may be used. Moreover, methods according to the present invention may operate in a single computer. The client devices 102a-n shown each include a computer-readable medium, such as a random access memory (RAM) 108, in the embodiment shown coupled to a processor 110. The processor 110 executes a set of computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, and JavaScript.

Client devices 102*a-n* may also include a number of external or internal devices such as a mouse, a CD-ROM, a keyboard, a display, or other input or output devices. Examples of client devices 102*a-n* are personal computers, digital assistants, personal digital assistants, cellular phones, mobile phones, smart phones, pagers, digital tablets, laptop computers, a processor-based device and similar types of systems and devices. In general, a client device 102*a-n* may be any type of processor-based platform connected to a network 106 and that interacts with one or more application programs. The client devices 102*a-n* shown include personal computers executing a browser application program such as Internet Explorer™, version 6.0 from Microsoft Corporation, Netscape Navigator™, version 7.1 from Netscape Communications Corporation, and Safari™, version 1.0 from Apple Computer.

Through the client devices 102*a-n*, users 112*a-n* can communicate over the network 106 with each other and with other systems and devices coupled to the network 106. As shown in FIG. 1, a server device 104 is also coupled to the network 106. In the embodiment shown, a user 112*a-n* can generate a search query 114 at a client device 102*a-n* to transmit to the server device 104 via the network 106. For example, a user 112*a* types a textual search query into a query field of a web page of a search engine displayed on the client device 102*a*, which is then transmitted via the network 106 to the server device 104. In the embodiment shown, a user 112*a-n* inputs a search query 114 at a client device 102*a-n* which transmits an associated search query signal 126 reflecting the search query 114 to the server device 104.

The server device 104 shown includes a server executing a search engine application program such as the Google™ search engine. Similar to the client devices 102*a-n*, the server device 104 shown includes a processor 116 coupled to a computer readable memory 118. Server device 104, depicted as a single computer system, may be implemented as a network of computer processors. Examples of a server devices 104 are servers, mainframe computers, networked computers, a processor-based device and similar types of systems and devices. Client processors 110 and the server processor 116 can be any of a number of well known computer processors, such as processors from Intel Corporation of Santa Clara, Calif. and Motorola Corporation of Schaumburg, Ill.

Memory 118 contains the search engine application program, also known as a search engine 124. The search engine 124 locates relevant information in response to a search query 114 from a user 112*a-n*.

The server device 104, or related device, has previously performed a search of the network 106 to locate articles, such as web pages, stored at other devices or systems connected to the network 106, and indexed the articles in memory 118 or another data storage device. Articles include, documents, for example, web pages of various formats, such as HTML, XML, XHTML, Portable Document Format (PDF) files, and word processor, database, and application program document files, audio, video, or any other information of any type whatsoever made available on a network (such as the Internet), a personal computer, or other computing or storage means. The embodiments described herein are described generally in relation to documents, but embodiments may operate on any type of article.

The search engine 124 responds to the associated search query signal 126 reflecting the search query 114 by returning a set of relevant information or search results 132 to client device 102*a-n* from which the search query 114 originated.

The search engine 124 shown includes a document locator 134, a ranking processor 136, and a related query processor 138. In the embodiment shown, each comprises computer code residing in the memory 118. The document locator 134 identifies a set of documents that are responsive to the search query 114 from a user 112*a*. In the embodiment shown, this is accomplished by accessing an index of documents, indexed in accordance with potential search queries or search terms. The ranking processor 136 ranks or scores the search result 132 including the located set of web pages or documents based upon relevance to a search query 114 and/or any other criteria. The related query processor 138 determines or otherwise measures a quality signal such as a related query signal 128 that reflects or otherwise corresponds to relevance of one or more web pages or documents in the located set of the search results 132. Note that other functions and characteristics of the document locator 134, ranking processor 136, and related query processor 138 are further described below.

Server device 104 also provides access to other storage elements, such as a related query data storage element, in the example shown a related query database 120, and a selection data storage element, in the example shown a selection data database 122. The specific selection database shown is a clickthrough database, but any selection data storage element may be used. Data storage elements may include any one or combination of methods for storing data, including without limitation, arrays, hashtables, lists, and pairs. Other similar types of data storage devices can be accessed by the server device 104. The related query database 120 stores data associated with relationships between a search query 114 and other search queries. A relationship between one or more search queries may be based upon a predetermined set of rules. The search engine 124 determines relationships or otherwise executes a set of instructions to determine relationships between search queries, and stores relationship-type data in the related query database 120. Alternatively, the related query processor 138 determines relationships or otherwise executes a set of instructions to determine relationships between search queries, and stores relationship-type data in the related query database 120.

It should be noted that the present invention may comprise systems having different architecture than that which is shown in FIG. 1. For example, in some systems according to the present invention, the related query database 120 and processor 138 may not be part of the search engine 124, and may carry out modification of selection data (such as click counts) or other operations offline. Also, in other embodiments, the related query processor 138 may affect the output of the document locator 134 or other system. The system 100 shown in FIG. 1 is merely exemplary, and is used to explain the exemplary methods shown in FIGS. 2-4.

Figure 2:
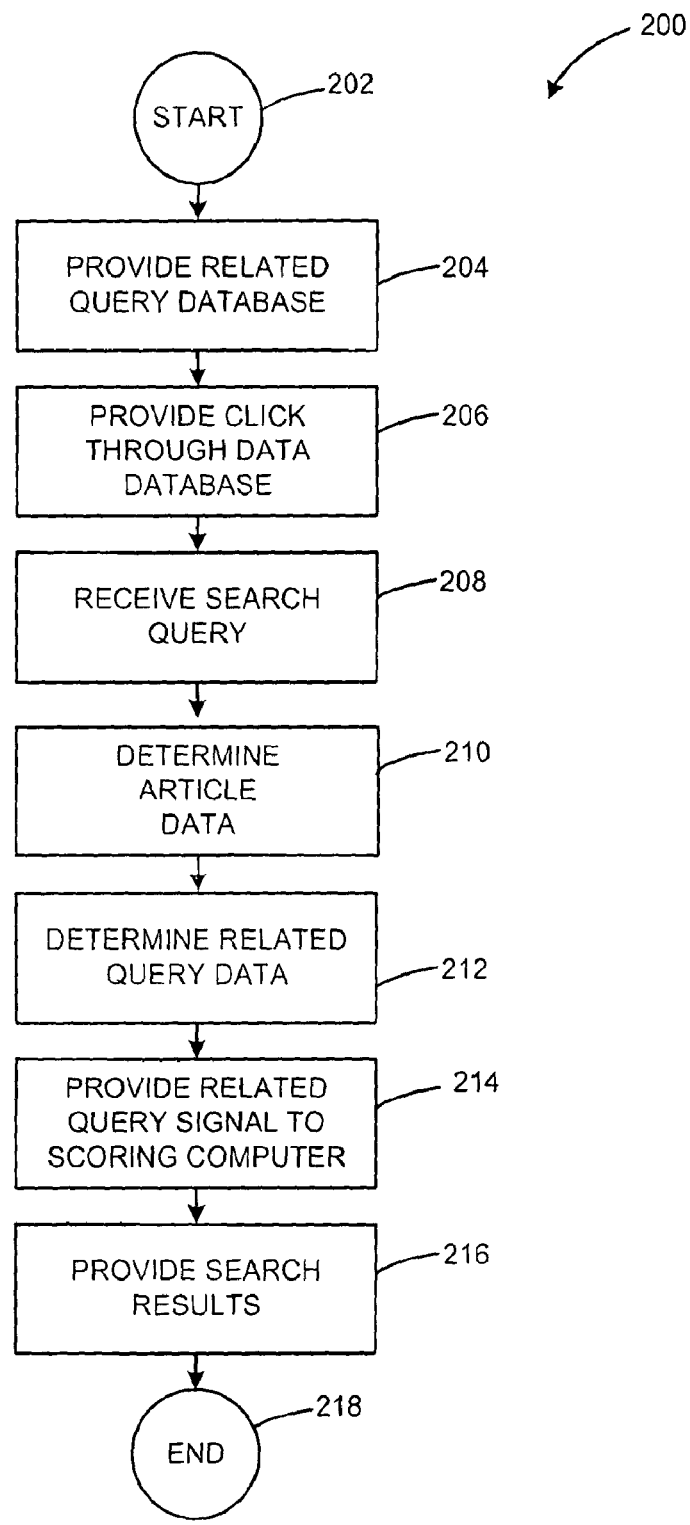
FIG. 2 illustrates a flow diagram of a method in accordance with one embodiment of the present invention.
Figure 3:
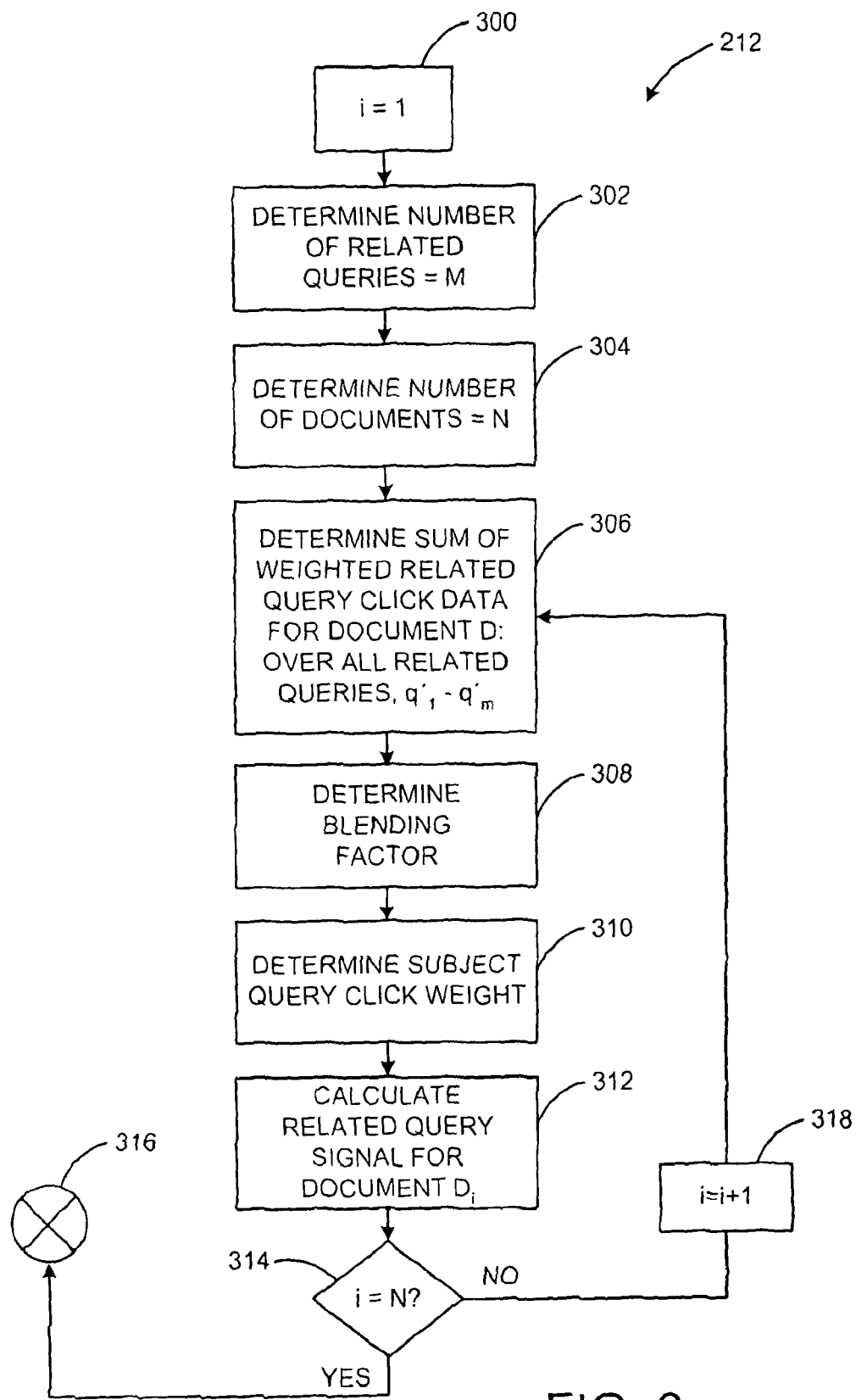
FIG. 3 illustrates a flow diagram of a subroutine of the method shown in FIG. 2.
Figure 4:
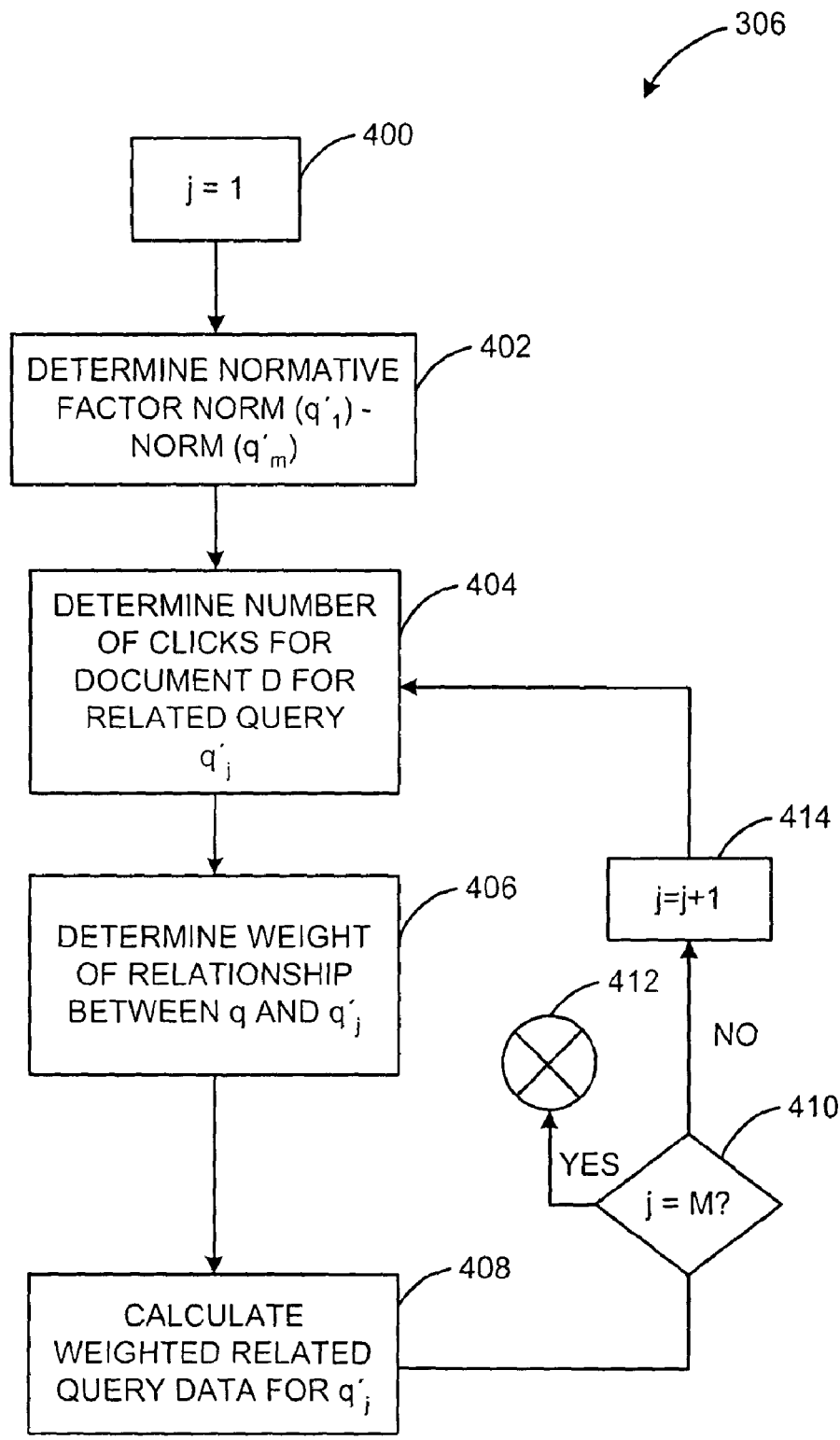
FIG. 4 illustrates a flow diagram of a subroutine of the subroutine shown in FIG. 3.

In the exemplary embodiment shown in FIG. 1, the related query database 120 and clickthrough database 122 contain data gathered and stored prior to carrying out the example method of the present invention as shown in FIGS. 2-4. Still referring to FIG. 1, the related query processor 138 shown determines a relationship between two search queries by recording and analyzing, for example, the proximity of one search query to another search query. For example, when a user 112*a* types in a first search query such as "infinity auto" and then inputs a second search query such as "infiniti" immediately afterward, the related query processor 138 may define a relationship between the first search query and the second search query. In this example, the relationship or proximity between search queries would be defined as "back-to-back" or consecutive. Thus, for the query "infinity auto," relationships to queries "infiniti," "luxury car," "quality luxury car," and "Japanese quality luxury car" may be defined if a user 112*a* inputs these queries immediately following the initial query "infinity auto." Other types of relationships or proximities can be defined according to the invention and stored by the related query database 120.

As another example, the related query database 120 can store information that the relationship between the first search query "infinity auto" and the second search query "infiniti" should be stronger or otherwise weighted heavier than the relationship between the first search query and a third search query "luxury car." In this example, a determination can be made to weight the relationship between the first search and second search query heavier than the relationship between the first search and third search query so that improved search results for subsequent search queries can be obtained from related queries. Types of weighting can include the number of times two search queries are input "back-to-back," or the proximity in time that two search queries are input. Other types of weighting or similar, relationship-type data can be defined by the invention and stored by the stored by a related query database 120.

The related query database 120 shown includes a list of related queries for a particular query. For example, for the search query "infinity auto," four related queries may be stored and associated with the search query "infinity auto." These related queries can be "infiniti," "luxury car," "quality luxury car," and "Japanese quality luxury car." This number of related queries is used for example purposes. In other embodiments, the number of related queries can be greater or fewer.

The clickthrough database 122 shown stores data associated with users' selection of a search result 132 from a search engine 124, such as from a list of documents located in response to a search query 114. For example, a user 112*a* enters an input at a client device 102*a-n*, such as manipulating a mouse or another input device to click on one or more URLs associated with web pages or documents of a search result 132. A user "click" is generated by the user's selection of a document located in the search result 132. This "click" on a document is stored in the clickthrough database 122 as a selection associated with the document's presence in a search result returned for a particular search query. Many other such related query lists, associated with other queries, may be stored there as well.

User clicks are generally referred to as "clickthrough" data. In the embodiment shown, the search engine 124 measures and stores the clickthrough data as well as other data related to each of the documents located in the search result 132.

Clickthrough data is generally an indicator of quality in a search result. Quality signals or clickthrough data can include, but is not limited to, whether a particular URL or document is clicked by a particular user; how often a URL, document, or web page is clicked by one or more users; and how often a particular user clicks on specific documents or web pages. Other types of quality signals similar to clickthrough data, such as user inputs or observational type data, can be stored by a clickthrough database 122 or similar data storage devices.

Other data related to documents located in a search result 132 that can be stored in a clickthrough database 122 or other data storage device can include, but is not limited to, how often a particular URL, document, or web page is shown in response to a search query 114; how many times a particular search query 114 is asked by users 112*a-n*; the age or time a particular document has been posted on a network 106, and identity of a source of a particular document on a network 106.

In the embodiment shown in FIG. 1, the server 104 is in communication with the related query database 120 and the clickthrough database 122. The server 104 carries out a process by which the data in the two databases 120, 122 are used to improve the search results provided in response to a search query 114 from a user 112*a*.

Various methods in accordance with the present invention may be carried out. One exemplary method according to the present invention comprises receiving a search query, determining a related query related to the search query, determining an article associated with the search query, and determining a ranking score for the article based at least in part on data associated with the related query. The related query may be related to the search query in any way, and determined to be related in any way. Examples of related queries include having been input as consecutive search queries by users previously (whether once or multiple times), queries input by a user within a defined time range (e.g., 30 minutes), a misspelling relationship, a numerical relationship, a mathematical relationship, a translation relationship, a synonym, antonym, or acronym relationship, or other human-conceived or human-designated association, and any computer- or algorithm-determined relationship, but the invention is not limited to any particular relationship. The related query data may comprise one or more of a variety of data associated with a related query in any way. Examples of related query data include a selection score for an article when associated with a related query (such as, for example, the number of times the article has been "clicked" when returned in search results in response to a search for the related query), a second selection score for a second article associated with the related query, and a total selection score for a plurality of articles associated with the first related query (such as, for example, the total number of clickthroughs for all or a defined number of articles when returned in search results for the related query). Other examples include the number of times the related query has been the subject of a search, the number of times search results for the related query have been shown to users, the number of times search results for the related query have included the first article, and the number of times search results for the related query shown have included the first article. Any data associated with the related query may be included in related query data, and these are merely examples.

In some embodiments, determining an article associated with the search query may comprise determining that the article is associated with both the search query and the related query (for example, the article may be returned in search results for both the search query and the related query). In such an embodiment or other embodiments, a selection score for the article when associated with the related query may be determined, and determining the ranking score for the first article may comprise determining the ranking score for the article based at least in part on the selection score. In one embodiment, it is determined that the article is associated with both the search query and with the first related query by determining an initial search result for the search query, the initial search result comprising the article, and determining that a search result for the related query comprises the article as well. In some embodiments, the article comprises a representation of the first article, such as a uniform resource locator.

Further, in some embodiments, determining the ranking score for the article comprises determining a number of times the article was selected when presented in search results for the related query. This may be accomplished in any fashion. One example is by determining a number of clickthroughs for the article when presented in search results for the related query.

In some embodiments, a ranking score for an article is determined. This may be accomplished in any fashion. In one embodiment, a mathematical function or algorithm may be used. One or more variables may be used in the function, including those associated with related queries and other variables. One example of determining a ranking score for an article comprises determining an initial ranking score for the article when associated with the search query, and calculating a mathematical function comprising the initial ranking score and the selection score. This mathematical function may be any of a variety of functions or algorithms. One such function comprises combining the initial ranking score and the selection score, weighted with at least one weighting factor. Other such functions comprise combining the initial ranking score and the selection score, normalized with at least one normalization factor. Again, these are only examples, and a variety of functions may be used.

In some embodiments, articles are ranked in relation to other articles based at least in part on related query data. For example, in one method a second article associated with the search query is determined, and a ranking score for the second article is determined based at least in part on data associated with the first related query. The first article and the second article are then ranked based at least in part on the first ranking score and the second ranking score. A search result for the search query having the first article and the second article ranked according at least in part to the first ranking score and the second ranking score may then be provided.

In some embodiments, a second related query related to the search query is determined, and the first ranking score for the first article is further based at least in part on data associated with the second related query. Data associated with one or more related queries may be used to score and rank articles and provide search results. These exemplary aspects of embodiments of the present invention may be repeated or iterated to improve search results.

FIGS. 2-4 illustrate an exemplary method 200 in accordance with the present invention in detail. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIGS. 2-4. The method 200 shown provides an improvement of a search ranking using clickthrough data and related queries.

Each block shown in FIGS. 2-4 represents one or more steps carried out in the exemplary method 200. Referring to FIG. 2, in block 202, the example method 200 begins. Block 202 is followed by block 204, in which a related query database 120 is provided. This may be accomplished by, for example, constructing such a database or establishing communication with such a database. As described with reference to FIG. 1, the related query database 120 stores relationship-type data between a search query 114 and other search queries.

Block 204 is followed by block 206, in which a selection data database, in this case a clickthrough database, is provided. This may be accomplished by, for example, constructing such a database or establishing communication with such a database. As described with reference to FIG. 1, the clickthrough database 122 stores data associated with users' clicks or inputs to a search result 132 provided by the search engine 124, such as a list of documents, such as web pages, provided in response to a search query 114 from a user 112a.

Block 206 is followed by block 208, in which a search query, in the form of a search query signal, is received by the server. In the embodiment shown, a user 112a generates a search query 114 at a client device 102a. The client device 102 transmits an associated search query signal 126 reflecting the search query 114 to the server device 104 via a network 106. The search engine 124 receives the search query signal 126 and processes the search query 114. For example, if the user 112a types a search query "infinity auto" into the search or query field of a search page on a browser application program, the client 102a transmits a search query signal 126 that includes the text "infinity auto" or some other representation or indication of "infinity auto." The search engine 124 receives the signal 126 and determines that "infinity auto" is the desired search query 114.

Block 208 is followed by block 210, in which article data, in the case shown, document data, is determined and received. In this block 210 in the embodiment shown, the search engine 124 conducts a search for relevant documents in a search database (not shown) or memory 118 that have previously been indexed from the network 106. The search engine 124 receives document data from the search database or memory 118 in response to the search query signal 126 reflecting the search query 114 from the user 112a. The document data is also referred to as the initial search result for the search query 114. Document data can include, but is not limited to, a universal resource locator (URL) that provides a link to a document, web page, or to a location from which a document or web page can be retrieved or otherwise accessed by the user 112 via the network 106. Note that document data is sometimes referred to as a "document" throughout the text of the specification. Alternatively, the document locator 134 obtains or otherwise receives document data in response to a search query signal 126 reflecting a search query 114.

For example, in block 210 shown, the search engine 124 shown would determine a list of documents responsive to the search query "infinity auto." This list of documents would comprise the determined document data. For example, this initial search result list for "infinity auto" could comprise a list of 15 documents. In the embodiment shown, this initial determination of document data may be by means of a conventional search engine query and results return.

Block 210 is followed by block 212, in which related query data is determined. In the embodiment shown, related query data is determined for each document in the initial search result for the search query by calculating a related query signal. In response to each document located in the initial search result, the search engine 124 generates a related query signal 128 for each particular document using a related signal query function. For example, in the embodiment shown, the related query processor 138 receives the initial search result. A related query signal function reflects a score for a document that includes data associated with at least one query related to the search query. The related query signal function, in this case a set of instructions processed by the related query processor 138 shown, determines a weighted value for each document in the initial search result depending upon the number of times other users have previously clicked or otherwise selected the particular document as a part of the initial search result, and upon the number of times other users have previously clicked or otherwise selected the particular document as part of search results for other queries related to the search query. A document that is selected a greater number of times may have a heavier weighted value generated than a document selected a fewer number of times. Note that other signals 130 can be generated for each document or web page based upon other inputs or observational data that could be stored in the related query database 120 and/or the click-through database 122, or another data storage device.

Any one or more of a variety of related query signal functions may be implemented by various embodiments of the invention. Examples of variables that may be included in a related query signal function include, without limitation, one or more of the following:

- a total selection score for a related query $q'_i$, (e.g., the total number of clicks on all documents shown in response to the related query $q'_i$), denoted $NU(q'_i)$
- an instance score for related query $q'_i$ was shown (e.g., the number of times related query $q'_i$ was received from users and/or the number of times search results for related query $q'_i$ were shown over a defined time period), denoted $S(q'_i)$
- a selection score for document d (e.g., number of clicks on document d) for a related query $q_i$, denoted $\#(d, q_i)$
- a number of times related query $q'_i$ and document d were shown together, denoted $S(d, q'_i)$
- a selection score for document d for a related query $q'_i$ in the context of query q, denoted $\#(d, q_i, q)$
- a total selection score for related query $q'_i$ (e.g., number of clicks on all documents returned for related query $q'_i$) in the context of query q, denoted $\#(q'_i, q)$
- a number of times related query $q'_i$ was shown in the context of query q, denoted $S(q_i, q)$
- a number of times related query $q'_i$ and document d were shown in the context of query q (in the context of query q means, for example, when there is an indication that the user was looking for query q, e.g., a user first input query q and then input query $q'_i$ as a search query, or when the user input query q or a query containing the input query q a defined time period—such as 30 minutes—before or after inputting related query $q'_i$), denoted $S(d, q'_i, q)$
- one or more blending factors that reflects, for example, trust in relevance and importance of the related queries, denoted A and λ;
- an initial selection score for document i (e.g., the number of clicks on document i made when the document is returned in search results for the search query), denoted # Initial
- a selected or calculated weight of relationship between the search query q and related query $q'_m$, denoted $W_m$
- a normalization factor that reflects, for example, how often a particular related query $q'_m$ is asked, denoted and Norm_$q'_m$; and
- one or more other ranking factors or scores, based on related queries, the article under consideration, and/or other factors.

There are a variety of other variables that may be included, and these are only examples. Moreover, these and other variables may be limited or defined by a designated time period, a designated number of users, the number of users who refined their query from q to $q'_i$ (e.g., the number who input a related query $q'_i$ after inputting a query q), by all those who input the query $q'_i$, or by other limitations or refinements. Variables, limitations, definitions, or other data associated with related queries are referred to generally as related query data.

An example of such a limitation is as follows: 1000 people input the search query "infiniti" in a search engine over a defined time period (such as one day), but only 20 people may have first input "infinity" and then input "infiniti." So, if we are given the original query "infinity," the term S(infiniti) could be set to 1000 or 20 in the related query function, as desired.

Examples of related query signal functions, designated as (1)-(6), are discussed briefly below.

A first example (1) of a related query function is as follows:

$$\# \text{Total}_i = A \times \# \text{Initial}_i + \left[(1-A) \times \sum_{m=1}^{M} \frac{(W_m \times \# q'_m)}{\text{Norm}\_q'_m}\right] \quad (1)$$

wherein "M" is the total number of related queries for examination (in the embodiment shown, it is the number returned in the initial determined document data for the search query);

"# $\text{Total}_i$" is the score calculated for document "i," (in the embodiment shown, it is the total number of user clicks on document "i" after counting clicks on the same document "i" when shown in search results for related queries ($q'_1 + q'_2 + \ldots q'_m$), and weighed and normalized as desired);

"A" is a blending factor that reflects trust in relevance and importance of the related queries ($q'_1 + q'_2 + \ldots q'_m$);

"# $\text{Initial}_i$" is an initial selection score for document "i" (in the embodiment shown, it is the number of clicks on document "i" made when the document is returned in search results for the search query (not counting clicks on related queries ($q'_1 + q'_2 + \ldots q'_m$)));

"$W_m$" is the weight of relationship between the search query "q" and related query "q'm";

"# $q'_m$" is the number of clicks on a related query "$q'_m$"; and

"Norm_$q'_m$" is a normalization factor that reflects how often a particular related query "$q'_m$" is asked.

A second example (2) of a related query function illustrates the use of other selection data including the number of times a particular query is shown to users, "S(q);" the number of times a particular document for a related query was shown to users, "S($q'_m$,d);" the number of clicks on a search query, "#q;" the number of clicks on a particular document for a related query, "#($q'_m$,d)," squared; and a weighting factor "$W_m$". It is as follows:

$$\# Total_i = \left(\frac{\#q}{S(q)} \times \#(q, d)\right) + \left(1 - \frac{\#q}{S(q)}\right) \sum_{m=1}^{M} \frac{W_m \times \#(q'_m, d)^2}{S(q'_m, d)} \quad (2)$$

"#q" is the number of clicks on search query "q;"

"S(q)" is the number of times a search query "q" was shown to users;

"#(q, d)" is the number of clicks on a particular document "d" for search query "q;"

"#(q'$_m$,d)" is the number of clicks on a particular document "d" for related query "q'$_m$;"; and "S(q'$_m$,d)" is the number of times a particular document for related query "q'$_m$" was shown to users.

Other variables are the same as described in relation to the first example (1).

A third example (3) of a related query function illustrates the use of various types of selection data with a weighting factor "W$_m$". It is as follows:

$$\# Total_i = \#(q, d) + \sum_{m=1}^{M} (W_m \times \#(q'_m, d)) \quad (3)$$

The variables in the related query function (3) are the same as described in relation to examples (1) and (2).

A fourth example (4) of a related query function illustrates the use of other types of selection data, such as the number of clicks on a particular document for a search query, "#(q, d$_i$)" with a weighting factor "W$_m$" and a blending factor "λ." It is as follows:

$$\# Total_i = \frac{\#(q, d) + \sum_{m=1}^{M}(W_m \times \#(q'_m, d))}{\lambda + \sum_{i}\left(\#(q, d_i) + \sum_{m=1}^{M}(W_m \times \#(q'_m, d))\right)} \quad (4)$$

"λ" is a blending factor that reflects trust in relevance and importance of the related queries (q'$_1$+q'$_2$+ ... q'$_m$).

The other variables in the related query function (4) are the same as described in relation to examples (1) and (2).

A fifth example of a related query function illustrates the use of various types of selection data with a weighting factor "W$_m$" and a blending factor "λ". It is as follows:

$$\# Total_i = \frac{\frac{\#(q, d)}{\lambda + \sum_{i}\#(q, d_i)} + \sum_{m=1}^{M}\left(W_m \times \frac{\#(q'_m, d_i)}{\lambda + \sum\#(q, d_i)}\right)}{1 + \sum_{m=1}^{M} W_m} \quad (5)$$

The variables in the related query function (5) are the same as described in relation to examples discussed above.

A sixth example of a related query function illustrates the use of a ranking score previously generated by the search engine for all queries, "Score (q, d);" and a ranking score previously generated by the search engine for a particular document "d" in all related queries, "Score (q'$_m$,d);" with various types of selection data such as the number of times a particular query is shown to users, "S(q);" and a weighting factor "W$_m$." An embodiment of this function may, in addition to using selection (such as clickthrough) information, use the score generated by a search engine on articles for related queries. For example, the function may use selection information combined with information on how well the article scores against the related query. It is as follows:

$$\# Total_i = \frac{\#q}{S(q)} \times \frac{\#(q, d)}{\#q} \times \text{Score}(q, d) + \quad (6)$$
$$\left(1 - \frac{\#q}{S(q)}\right) \times \sum_{m=1}^{M}\left(W_m \times \frac{(\#(q'_m, d) \times \text{Score}(q'_m, d))}{\#(q'_m)}\right)$$

"S(q)" is the number of times a search query "q" was shown to users;

"Score (q, d)" is a ranking score previously generated by the search engine for all queries, or can be a score that represents how well a document "d" is believed to match query "q" based on one or more factors, such as textual factors;

"Score (q'$_m$,d)" is a ranking score previously generated by the search engine for a particular document "d" in all related queries (q'$_1$+q'$_2$+ ... q'$_m$), or can be a score that represents how well a document "d" is believed to match related query "q'$_m$" based on one or more factors.

The other variables in the related query function (6) are the same as described in relation to the examples discussed above.

For purposes of illustration, the algorithm from example (1) is embodied in the example embodiment shown in FIGS. 2-4. Other algorithms besides the examples shown in (1)-(6) may be used in accordance with the present invention, and algorithms (1)-(6) are provided to illustrate examples. Such other algorithms may contain some, all, or none of the variables shown in (1)-(6).

FIG. 3 illustrates an example of a subroutine 212 for carrying out the method 200 shown in FIG. 2 in accordance with example (1). The subroutine 212 provides a related query signal 128 for each document received in an initial search result 132. An example of subroutine 212 is as follows.

The subroutine 212 begins at block 300. At block 300, a counter associated with the search engine 124 is set to a value such as "1." For example, the related query processor 138 can set a variable "i" in an associated memory 118 to an initial value of "1." The counter or variable "i" counts the number of documents that are processed by the subroutine 212, and the current value of "i" reflects which document in the list of documents in the document data is under operation.

Block 300 is followed by block 302, in which the number of queries related to the search query is determined. The search engine 124 calls to the related query database 120 for the number of queries related to a particular query. For example, the related query processor 138 retrieves data from the related query database 120 associated with the number of queries related to a particular query. This type of data includes any relationship data as described in block 204 or other relationship-type data stored in the related query database 120 or other data storage device.

By way of example, the number of related queries can be characterized by the variable "M." If the related query processor 138 determines that there are four related queries for a particular query 114, the variable "M" may be set at a value of "4," and the related queries may be designated as follows: q'$_1$, q'$_2$, q'$_3$, and q'$_4$. Thus, for the query "infinity auto," if relationships to queries "infiniti," "luxury car," "quality luxury car," and "Japanese quality luxury car" have been previously defined and stored for the query "infinity auto," the related query processor 138 obtains the number of related queries from the related query database 120, in this instance "4." Moreover, $q'_1$="infiniti," $q'_2$="luxury car," $q'_3$="quality luxury car," and $q'_4$="Japanese quality luxury car." In other embodiments, the set of M related queries to be analyzed may be a subset of the total number of recognized related queries; for example, a query may be determined to have 100 related queries, but only the top 20 related queries (as determined according to, for example, the weight of relationship between the particular query and the related query, or by any other means) may be used.

Block 302 is followed by block 304, in which a number of documents is determined. In block 210, the server 104 received document data associated with the search query 114. Among the data determined was the total number of documents in the list of documents responsive to the search query. This number of documents is characterized by (and is set as) the variable "N." For example, as mentioned earlier, a search result for the search query "infinity auto" could have 15 documents, and the server 104 would set "N" to a value of "15."

Note that in alternative embodiments, any total number of documents for a search query that has been defined or otherwise stored by the related query database 120 or another data storage device for a particular query can be transmitted to, or otherwise determined by the search engine 124 or related query processor 138. Further note that the number of documents for each search result for a particular search query can depend upon the relationship-type data previously stored in the related query database 120 as well as clickthrough data stored in the clickthrough database 122, or on other similar types of data stored in other data storage devices.

Block 304 is followed by block 306, in which a sum of weighted related query click data for a particular document over all related queries is determined. In the embodiment shown, the search engine 124 determines a sum of weighted related query click data for a particular document over all related queries such as a weighted value that describes the total number of clicks on documents associated with all documents associated with related queries. For example, the related query processor 138 determines a sum which reflects some or all user clicks on a document when returned in response to prior searches for the related queries. The sum can then be applied by the search engine 124 or related query processor 138 to a related query signal function or to set of computer-executable instructions.

FIG. 4 illustrates an example of subroutine 306 shown in FIG. 3. The subroutine 306 provides a sum of weighted related query click data for a particular document over all related queries.

This embodiment of subroutine 306 begins at block 400. At block 400, a counter associated with the search engine 124 is initialized to the value of "1." For example, a variable "j" in memory 118 can be initially set to the value of "1." The counter or variable "j" counts the number of related queries that have been processed by the subroutine 306.

Block 400 is followed by block 402, in which a normalization factor is determined. The normalization factor is a reflection of how often a particular related query is asked or otherwise input by users 112. In the embodiment shown, the search engine 124 determines a normalization factor that describes how often a particular query is asked by users. For example, the related query processor 138 retrieves clickthrough data from the clickthrough database 122. The related query processor 138 then applies a predetermined equation or set of computer-executable instructions to some or all of the clickthrough data to define a normalization factor for each related query. Note that normalization factors are parameters that can be set either manually or in some automated fashion from the data. For example, the normalization factor could be the sum of the weighting factors for each respective variable "M."

A normalization factor for each related query, $q'_1$, $q'_2$, ... $q'_m$, can be defined as Norm_$q'_1$, Norm_$q'_2$, ... Norm_$q'_m$, respectively, as shown in the related query signal function above in subroutine 212. Thus, as applied to the prior example for the query "infinity auto," the related query processor 138 can define a normalization factor, Norm_$q'_1$, Norm_$q'_2$, Norm_$q'_3$, Norm_$q'_4$, respectively, for each previously identified related queries "infiniti," "luxury car," "quality luxury car," and "Japanese quality luxury car." These normalization factors could then be applied to the related query signal function shown above in subroutine 212.

Block 402 is followed by block 404, in which a number of selections, in this case clicks, is determined for the current document of interest (document "i") for a related query (related query "j"). The search engine 124 determines the number of clicks for document "i" when document "i" is returned in search results for query "j." For example, the related query processor 138 accesses clickthrough data stored by the clickthrough database 122 or other data storage devices. In some embodiments, this clickthrough data is weighted by the number of times a selection option for the document was displayed to users in response to the query (i.e., realization of clickthrough as a percentage based on the number of displays to the user). The related query processor 138 applies a predetermined equation or set of computer-executable instructions to some or all of the clickthrough data to determine the number of clicks for a particular document for a related query.

For example, for the query "infinity auto," it was determined that as described above that related query $q'_1$ is "infiniti." In block 404, the search engine determines the number of clicks made by other users over a defined time with the document of interest (document "i") when that document (document "i") is returned in response to the search query "infiniti."

Block 404 is followed by block 406, in which a weight of a relationship between the search query and a related query is determined. The search engine 124 determines the weight of a relationship between a present query and a related query. For example, the related query processor 138 accesses the related query database 120 or other data storage device to retrieve relationship data. Using a predetermined equation or set of computer-executable instructions, the related query processor 138 determines the weight of a relationship between a present query and a related query.

If weighting values or scores for related queries have previously been stored in the related query database 120, the related query processor 138 retrieves the weighting values or scores for related queries. For example, the related query database 120 may indicate that the relationship between a first query "infinity auto" and a second query "infiniti" should be stronger than the relationship between the first query and a third query "luxury car." In this example, a determination can be made to weight the relationship between the first and second query heavier than the relationship between the first and third query so that improved search results can be obtained from related queries.

In the embodiment shown, the weight of a relationship between a present query and a related query is represented by $W_1, W_2, \ldots W_m$ in the related query signal function of subroutine 212. Thus, as applied to the prior example for the query "infinity auto," the related query processor 138 can define a weight for the relationship between the query "infinity auto" and each of the previously identified related queries "infiniti," "luxury car," "quality luxury car," and "Japanese quality luxury car." The weight of the relationship for each related queries would then be represented in the related query signal function above in subroutine 212 as $W_1$, $W_2$, $W_3$, $W_4$, respectively. Thus, when j="1," the search engine determines the weight of the relationship, $W_1$, between "infinity auto" and "infiniti;" when j="2," the search engine determines $W_2$ between "infinity auto" and "luxury car;" when j="3," the search engine determines $W_3$ between "infinity auto" and "quality luxury car;" and when j="4," the search engine determines $W_4$ between "infinity auto" and "Japanese quality luxury car."

In this and other examples, weighting of the relationship can be based on proximity between a search query and related queries, the number of times two queries are input "back-to-back," or the proximity in time that two queries are input. Other weighting factors can be defined in a predetermined set of rules as described above with respect to the related query database 120.

Block 406 is followed by block 408, in which weighted related query data is determined. The search engine 124 determines weighted query data using one or more predetermined factors. For example, the related query processor 138 utilizes the normalization factor, the number of clicks for a particular document for a related query, and the weight of relationship between a present query and a related query to determine weighted related query data.

As applied to the prior example for the query "infinity auto," the related query processor 138 processes a respective normalization factor (Norm_$q'_1$) for a first related query "infiniti," a number of clicks for a particular document for the related query "infiniti" (#$q'_1$), and a weight of relationship between the query "infinity auto" and "infiniti" ($W_1$) to determine a value for weighting the related query data for the particular related query "infiniti." Other values for weighting the related query data for the other related queries "luxury car," "quality luxury car," and "Japanese quality luxury car" can be similarly processed with each related queries' respective factors and components as described in blocks 402-404.

In the embodiment shown, the weight ($W_1$) of the relationship between "infinity auto" and "infiniti" is multiplied by the number of clicks (#$q'_1$) on document "i" for the related inquiry "infiniti," and then the result is divided by the normalization factor (Norm_$q'_1$) to determine a value representing the weighted related query data for a document "i."

Block 408 is followed by decision block 410, in which a decision is made whether all of the related queries associated with the search query have been processed. The search engine 124 compares the counter or variable "j" initially set at a value of "1" in block 400 to the variable "M," which has been set to a value according to the number of related queries (M=4 in the example under discussion). If all the related queries have been processed, then the "YES" branch is followed to block 412. In some embodiments, this variable "M" may be assigned a maximum, e.g. 1000.

In block 412, the subroutine 308 ends.

If, however, in decision block 410, not all of the related queries have been processed or a set maximum has been reached, then the "NO" branch is followed to block 414.

In block 414, a counter is incremented to the next value to track the number of related queries that have been processed. For example, the counter or variable "j" initially set at a value of "1" is incremented to a next value of "2." The subroutine 308 then returns to block 404 to process in relation to the next related query ($q'_2$). Subsequent related queries are processed by blocks 404-408, and the counter at block 414 is incremented, and the process 404-408 repeated, until all of the related queries are processed. Thus, in the example provided previously for the search query "infinity auto," blocks 404-408 would process the remaining related queries "luxury car," "quality luxury car," and "Japanese quality luxury car."

When all of the documents have been processed, the "YES" branch is followed from decision block 410, and the subroutine 308 ends at block 412.

Returning to FIG. 3, subroutine 306 is followed by block 308, in which a blending factor is determined. The search engine 124 determines a blending factor that reflects the reliability or perceived trust in the quality of related queries for a particular query. For example, the related query processor 138 utilizes a predetermined equation or set of computer-executable instructions to determine the blending factor that accounts for the reliability or perceived trust in the quality of the related queries for a particular query. The blending factor can be particularly useful if a series of related queries is from a particular source known or otherwise perceived not to be reliable or otherwise trustworthy. In that case, the blending factor can be used to affect or otherwise influence the weight or value of the data associated with the related queries. In most instances, the blending factor is applied to a related query signal function or to a set of computer-executable instructions processed by the related query processor 138. Note that blending factors are parameters that can be set either manually or in some automated fashion from the data. In one embodiment, the blending factor indicates the amount of trust in user clicks on the original query "q" over clicks on related queries.

As applied to the prior example for the query "infinity auto," the related query processor 138 determines a blending factor for the related queries "infiniti," "luxury car," "quality luxury car," and "Japanese quality luxury car," as represented by "A" in the related query signal function above in subroutine 212. This factor indicates the reliability or perceived trust in the relatedness of the related queries to "infinity auto."

Block 308 is followed by block 310, in which a subject query click weight is determined. The search engine 124 determines a subject query click weight using the number of actual clicks on the particular document of interest (document "i") in a search result 132 for the search query 114. For example, the related query processor 138 retrieves clickthrough data from the clickthrough database 122 or other data storage device. The related query processor 138 processes a portion of or all of the clickthrough data with a predetermined equation or set of computer-executable instructions to determine the subject query click weight which is a function of the clickthrough data associated with a particular document for the subject search query. In most instances, clickthrough data for a single document "N" located in a search result 132 for the user's search query 114 is used to determine a subject query click weight. In the embodiment shown, this click number is then weighted by, for example, applying a multiplier "A."

As applied to the prior example for the query "infinity auto," the related query processor 138 determines a subject query click weight for particular search query "infinity auto," as represented by "# Initial$_i$" in the related query signal function above in subroutine 212. The subject query click weight can be expressed a total number of user clicks on a particular document "i" for the query "infinity auto." A multiplier such as "A" can then be applied to "# Initial$_i$" to obtain the subject query click weight for a document "i."

Block 310 is followed by block 312, in which a related query signal for a document is determined. The search engine 124 determines a related query signal 128 for a particular document in a search result 132. For example, the related query processor 138 uses a number of factors such as the number of related queries; the number of documents for the related queries; the sum of weighted related query click data for a document over all related queries, the blending factor, if needed, and the subject query click weight, to determine a related query signal 128 for a particular document in a search result.

In the embodiment shown, this related query signal is calculated using the data determined in previous blocks discussed. As applied to the prior example for the query "infinity auto," the related query processor 138 determines a related query signal 128 for a particular document in a search result 132. As represented by "# $Total_i$," in the related query signal function as shown above in subroutine 212, a weighted value representing the weighted total number of user clicks on document "i" after counting clicks on related queries is determined by the related query processor 138. This is carried out by performing the mathematical functions as indicated by the algorithm described above to calculate the "# $Total_i$" for document "i."

Block 312 is followed by decision block 314, in which a decision is made whether all documents for related queries have been processed. The search engine 124 compares the counter or variable "i" initially set at a value of "1" in block 300 to the variable "N," which has been set to a value according to the number of documents to be processed for the search query. If all the documents have been processed, then the counter or variable "i" will equal the variable "N" and the "YES" branch is followed to block 316. In alternative embodiments, a maximum number of documents for analysis may be set. For example, "N" may be set to a maximum number that is less than the number of documents determined in block 304.

In block 316, the subroutine 212 ends.

If however in decision block 314, not all of the documents have been processed and the counter or variable "i" is not equal to the variable "N," then the "NO" branch is followed to block 318.

In block 318, a counter is incremented to track the number of documents that have been processed. For example, the counter or variable "i" initially set at a value of "1" is incremented to a next value such as "2." The subroutine 212 then returns to block 306 to continue processing the next document. Subsequent documents are processed by blocks 306-314, and the counter or variable "i" at block 318 is subsequently incremented until all of the documents are processed, and the value of the counter or variable "i" equals "N." Thus, in the example provided previously for "infinity auto," all 15 documents of the search result for the search query "infinity auto" would be processed by blocks 306-314.

When all of the documents have been processed, the "YES" branch is followed from decision block 314, and the subroutine 212 ends at block 316.

Referring again to FIG. 2, subroutine 212 is followed by block 214, in which the related query signal for each document is provided to the ranking processor. For example, in the embodiment shown, the calculated variable "# $Total_i$" for each document "1-N" would be included in "N" related query signals. The related query signal 128 for each document is transmitted to the ranking processor 136 for determining subsequent rankings or scores of search results in response to other search queries. The ranking processor 136 includes a ranking or scoring function or set of computer-executable instructions that incorporates the related query signal 128 and/or other output from the related query processor 138. For example, a weighted value generated from subroutine 212 is transmitted to the ranking processor 136, which utilizes a related query signal 128 such as a weighted value to rank or otherwise score subsequent search results. Other signals 130 generated for each document by the search engine 124 or another system or method can also be transmitted to the ranking processor 136 to rank or score subsequent search results.

Block 214 is followed by block 216, in which search results are provided. The ranking processor 136 generates a ranking or scoring of each document located in a search result 132 in response to a search query 114. Using the related query signal 128 from block 214, such as a weighted value, the ranking processor 136 affects the ranking or scoring of one or more documents located in a search result 132. Note that the ranking processor 136 can use other signals such as those shown in FIG. 1 as 130 in conjunction with the related query signal 128 to rank or otherwise score documents of a search result 132. In some instances, the ranking processor 136 can further decide whether to utilize a particular related query signal 128 and/or other signals 130 during processing of a score or ranking for a search result 132.

Block 216 is followed by block 218, in which the method 200 ends.

In other embodiments of the invention, the method 200 can be utilized in an iterative manner to determine a new or updated related query signal whenever new or changes to data in the related query database 120 and/or clickthrough database 122 or other data storage devices is received or otherwise obtained. When a new or updated related query signal is determined, the signal can then be transmitted to the ranking processor 136 to change or to update the ranking or scores for a search result 132.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A computer-implemented method comprising:
   (a) receiving, at a computer system, a search query from a first user;
   (b) identifying by the computer system a first related query as being related to the search query based on information that indicates relative timing or sequencing between the search query and the first related query in prior submissions to the computer system by a plurality of users that include users other than the first user;
   (c) identifying a first article that is responsive to the search query;
   (d) in response to identifying the first article as responsive to the search query, retrieving data associated with the first related query that indicates, at least, a frequency with which users have selected the first article when the first article has been presented as a search result for the first related query; and
   (e) determining a first ranking score for the first article as a search result for the received search query based at least in part on the retrieved data associated with the first related query.

2. The method of claim 1, wherein the data associated with the first related query comprises a total selection score for the first related query.

3. The method of claim 2, wherein the total selection score comprises a total number of users that selected a result returned for a search for the first related query.

4. The method of claim 2, wherein the total selection score for the first related query comprises selections of any article provided in search results for the first related query in a context of the search query, wherein the selections are in the context of the search query when the selections are made within a threshold timing or sequencing of the search query being submitted to the computer system.

5. The method of claim 1, wherein the data associated with the first related query comprises an instance score for the first related query.

6. The method of claim 5, wherein the instance score comprises a number of instances the first article was shown in a search result for the first related query.

7. The method of claim 6, wherein the number of instances the first article was shown in a search result for the first related query comprises instances shown in a context of the search query, wherein the instances are in the context of the search query when the instances are shown within a threshold timing or sequencing of the search query being submitted to the computer system.

8. The method of claim 5, wherein the instance score for the first related query comprises selections of any article provided in search results for the first related query in a context of the search query, wherein the selections are in the context of the search query when the selections are made within a threshold timing or sequencing of the search query being submitted to the computer system.

9. The method of claim 1, wherein the data associated with the first related query comprises a selection score for the first article.

10. The method of claim 9, wherein the selection score for the first article comprises selections of the first article provided in search results for the first related query in a context of the search query, wherein the selections are in the context of the search query when the selections are made within a threshold timing or sequencing of the search query being submitted to the computer system.

11. The method of claim 1, wherein the related query data associated with the first related query comprises a second selection score for a second article associated with the first related query.

12. The method of claim 1, wherein identifying the first article as responsive to the search query comprises identifying the first article as responsive to both the search query and the first related query.

13. The method of claim 12, further comprising determining a first selection score for the first article as a search result for the first related query, and wherein determining the first ranking score for the first article based at least in part on the data associated with the first related query comprises determining the first ranking score for the first article based at least in part on the first selection score.

14. The method of claim 13, wherein determining the first ranking score for the first article comprises:
 determining a first initial ranking score for the first article as a search result for the search query; and
 calculating a mathematical function comprising the first initial ranking score and the first selection score.

15. The method of claim 14, wherein calculating the mathematical function comprising the first initial ranking score and the first selection score comprises combining the first initial ranking score and the first selection score, weighted with at least one weighting factor.

16. The method of claim 12, wherein identifying the first article as responsive to both the search query and the first related query comprises:
 identifying an initial search result for the search query, the initial search result comprising the first article; and
 determining that a search result for the first related query comprises the first article.

17. The method of claim 1, wherein the first article comprises a representation of the first article.

18. The method of claim 17, wherein the representation of the first article comprises a uniform resource locator.

19. The method of claim 1, wherein determining the first ranking score for the first article as a search result for the first related query comprises determining a number of times the first article was selected when presented in search results for the first related query.

20. The method of claim 19, wherein determining the number of times the first article was selected when presented in search results for the first related query comprises determining a number of clickthroughs for the first article when presented in search results for the first related query.

21. A computer program product tangibly embodied in one or more non-transitory computer-readable media storing instructions that, when executed, cause a processor to perform operations comprising:
 (a) receiving a search query from a first user;
 (b) identifying a first related query as being related to the search query based on information that indicates relative timing or sequencing between the search query and the first related query in prior submissions by a plurality of users that include users other than the first user;
 (c) identifying a first article that is responsive to the search query;
 (d) in response to identifying the first article as responsive to the search query, retrieving data associated with the first related query that indicates, at least, a frequency with which users have selected the first article when the first article has been presented as a search result for the first related query; and
 (e) determining a first ranking score for the first article as a search result for the received search query based at least in part on the retrieved data associated with the first related query.

22. The computer program product of claim 21, wherein the data associated with the first related query comprises a total selection score for the first related query.

23. The computer program product of claim 22, wherein the total selection score comprises a total number of users that selected a result returned for a search for the first related query.

24. The computer program product of claim 22, wherein the total selection score for the first related query comprises selections of any article provided in search results for the first related query in a context of the search query, the selections being in the context of the search query when the selections are made within a threshold timing or sequencing of the search query being submitted.

25. The computer program product of claim 21, wherein the data associated with the first related query comprises an instance score for the first related query.

26. The computer program product of claim 25, wherein the instance score comprises a number of instances that the first article was shown in a search result for the first related query.

27. The computer program product of claim 26, wherein the number of instances the first article was shown in a search result for the first related query comprises instances shown in a context of the search query, the instances being in the context of the search query when the instances are shown within a threshold timing or sequencing of the search query being submitted.

28. The computer program product of claim 25, wherein the instance score for the first related query comprises selections of any article provided in search results for the first related query in a context of the search query, the selections being in the context of the search query when the selections are made within a threshold timing or sequencing of the search query being submitted.

29. The computer program product of claim 21, wherein identifying the first article as responsive to the search query comprises identifying the first article as responsive to both the search query and the first related query.

30. The computer program product of claim 29, wherein the operations further comprise determining a first selection score for the first article as a search result for the first related query, and wherein determining the first ranking score for the first article based at least in part on the data associated with the first related query comprises determining the first ranking score for the first article based at least in part on the first selection score.

31. The computer program product of claim 30, wherein determining the first ranking score for the first article comprises:
   determining a first initial ranking score for the first article as a search result for the search query; and
   calculating a mathematical function comprising the first initial ranking score and the first selection score.

32. The computer program product of claim 31, wherein calculating the mathematical function comprising the first initial ranking score and the first selection score comprises combining the first initial ranking score and the first selection score, weighted with at least one weighting factor.

33. The computer program product of claim 29, wherein identifying the first article as responsive to both the search query and the first related query comprises:
   identifying an initial search result for the search query, the initial search result comprising the first article; and
   determining that a search result for the first related query comprises the first article.

34. The computer program product of claim 21, wherein the data associated with the first related query comprises a selection score for the first article.

35. The computer program product of claim 34, wherein the selection score for the first article comprises selections of the first article provided in search results for the first related query in a context of the search query, the selections being in the context of the search query when the selections are made within a threshold timing or sequencing of the search query being submitted.

36. The computer program product of claim 21, wherein the related query data associated with the first related query comprises a second selection score for a second article associated with the first related query.

37. The computer program product of claim 21, wherein the first article comprises a representation of the first article.

38. The computer program product of claim 37, wherein the representation of the first article comprises a uniform resource locator.

39. The computer program product of claim 21, wherein determining the first ranking score for the first article as a search result for the first related query comprises determining a number of times the first article was selected when presented in search results for the first related query.

40. The computer program product of claim 39, wherein determining the number of times the first article was selected when presented in search results for the first related query comprises determining a number of clickthroughs for the first article when presented in search results for the first related query.

41. A system comprising:
   one or more computer servers;
   an interface of the computer servers that is configured to receive a search query from a first user;
   a related query processor of the computer servers that is configured to identify a first related query as being related to the search query based on information that indicates relative timing or sequencing between the search query and the first related query in prior submissions by a plurality of users that include users other than the first user;
   a document locator of the computer servers that is configured to identify a first article that is responsive to the search query; and
   a ranking processor of the computer servers that is configured to, in response to identification of the first article as responsive to the search query by the document locator, retrieve data associated with the first related query that indicates, at least, a frequency with which users have selected the first article when the first article has been presented as a search result for the first related query, wherein the ranking processor is further configured to determine a first ranking score for the first article as a search result for the received search query based at least in part on the retrieved data associated with the first related query.

42. The system of claim 41, wherein the data associated with the first related query comprises a total selection score for the first related query.

43. The system of claim 42, wherein the total selection score comprises a total number of users that selected a result returned for a search for the first related query.

44. The system of claim 42, wherein the total selection score for the first related query comprises selections of any article provided in search results for the first related query in a context of the search query, the selections being in the context of the search query when the selections are made within a threshold timing or sequencing of the search query being submitted to the computer servers.

45. The system of claim 41, wherein the data associated with the first related query comprises an instance score for the first related query.

46. The system of claim 45 wherein the instance score comprises a number of instances the first article was shown in a search result for the first related query.

47. The system of claim 46, wherein the number of instances the first article was shown in a search result for the first related query comprises instances shown in a context of the search query, the instances being in the context of the search query when the instances are shown within a threshold timing or sequencing of the search query being submitted to the computer servers.

48. The system of claim 45, wherein the instance score for the first related query comprises selections of any article provided in search results for the first related query in a context of the search query, the selections being in the context of the search query when the selections are made within a threshold timing or sequencing of the search query being submitted to the computer servers.

49. The system of claim 41, wherein identifying the first article as responsive to the search query comprises identifying the first article as responsive to both the search query and the first related query.

50. The system of claim 49, wherein the ranking processor is further configured to determine a first selection score for the first article as a search result for the first related query, and wherein determining the first ranking score for the first article based at least in part on the data associated with the first related query comprises determining the first ranking score for the first article based at least in part on the first selection score.

51. The system of claim 50, wherein the ranking processor is further configured to determine the first ranking score for the first article by determining a first initial ranking score for the first article as a search result for the search query, and to calculate a mathematical function that comprises the first initial ranking score and the first selection score.

52. The system of claim 51, wherein calculating the mathematical function comprising the first initial ranking score and the first selection score comprises combining the first initial ranking score and the first selection score, weighted with at least one weighting factor.

53. The system of claim 49, wherein the document locator is further configured to identify the first article as being responsive to both the search query and the first related query by identifying an initial search result for the search query, the initial search result comprising the first article; and determining that a search result for the first related query comprises the first article.

54. The system of claim 41, wherein the data associated with the first related query comprises a selection score for the first article.

55. The system of claim 54, wherein the selection score for the first article comprises selections of the first article provided in search results for the first related query in a context of the search query, the selections being in the context of the search query when the selections are made within a threshold timing or sequencing of the search query being submitted to the computer servers.

56. The system of claim 41, wherein the related query data associated with the first related query comprises a second selection score for a second article associated with the first related query.

57. The system of claim 41, wherein the first article comprises a representation of the first article.

58. The system of claim 57, wherein the representation of the first article comprises a uniform resource locator.

59. The system of claim 41, wherein the ranking processor is further configured to determine the first ranking score for the first article by determining a number of times the first article was selected when presented in search results for the first related query.

60. The system of claim 59, wherein determining the number of times the first article was selected when presented in search results for the first related query comprises determining a number of clickthroughs for the first article when presented in search results for the first related query.

* * * * *